US012769637B2

(12) United States Patent
Kim et al.

(10) Patent No.: US 12,769,637 B2
(45) Date of Patent: Oct. 20, 2026

(54) SIMULATION SYSTEM FOR ACCIDENT ANALYSIS OF AUTONOMOUS EMERGENCY BRAKING DEVICE AND SIMULATION METHOD THEREOF

(71) Applicant: REPUBLIC OF KOREA (NATIONAL FORENSIC SERVICE DIRECTOR MINISTRY OF PUBLIC ADMINISTRATION AND SECURITY, Seoul (KR)

(72) Inventors: Jonghyuk Kim, Gangwon-do (KR); Jihun Choi, Gangwon-do (KR); Hyunseo Han, Gangwon-do (KR); Songhui Kim, Gangwon-do (KR); Hasun Park, Gangwon-do (KR)

(73) Assignee: NATIONAL FORENSIC SERVICE DIRECTOR MINISTRY OF PUBLIC ADMINISTRATION AND SECURITY, Seoul (KR)

( * ) Notice: Subject to any disclaimer, the term of this patent is extended or adjusted under 35 U.S.C. 154(b) by 1052 days.

(21) Appl. No.: 17/937,812

(22) Filed: Oct. 4, 2022

(65) Prior Publication Data

US 2023/0350779 A1 Nov. 2, 2023

(30) Foreign Application Priority Data

Apr. 28, 2022 (KR) ........................ 10-2022-0052874

(51) Int. Cl.
*G06F 11/34* (2006.01)
*G06F 11/26* (2006.01)

(52) U.S. Cl.
CPC ........ *G06F 11/3457* (2013.01); *G06F 11/261* (2013.01)

(58) Field of Classification Search
CPC ...... G06F 11/3457; G06F 30/20; G06F 30/15; G06F 11/261; B60T 2201/024; B60T 7/22; B60T 8/17558; G01S 13/931
See application file for complete search history.

(56) References Cited

U.S. PATENT DOCUMENTS 3,594,921 A * 7/1971 Quicker, Jr. ........... G09B 9/048
434/64
2019/0050520 A1* 2/2019 Alvarez .................. G06F 30/15
(Continued)

FOREIGN PATENT DOCUMENTS

KR 101357596 2/2014

OTHER PUBLICATIONS

Lee et al., "Design of Emergency Braking Algorithm for Pedestrian Protection Based on Multi-Sensor Fusion" (Aug. 5, 2017), International Journal of Automotive Technology, vol. 18, pp. 1067-1076 [retrieved from https://link.springer.com/article/10.1007/s12239-017-0104-7]. (Year: 2017).*
(Continued)

*Primary Examiner* — Brian W Wathen
(74) *Attorney, Agent, or Firm* — Perman & Green, LLP

(57) ABSTRACT

Provided is a simulation system for accident analysis of an autonomous emergency braking device, the simulation system including a data input unit configured to receive virtual driving data including state data about a virtual driving vehicle, a target, and a driving environment; a radar driving logic unit configured to calculate a relative speed, a relative distance, and an azimuth between the virtual driving vehicle and the target based on the virtual driving data; and an autonomous emergency braking driving logic unit configured to output a warning signal or apply a braking pressure to the virtual driving vehicle according to a sequence of the autonomous emergency braking device, and to calculate
(Continued)

collision data including a final stopping distance and a collision speed.

12 Claims, 9 Drawing Sheets

(56) References Cited

U.S. PATENT DOCUMENTS

| | | | | |
|---|---|---|---|---|
| 2021/0103285 | A1* | 4/2021 | Philbin | G05D 1/617 |
| 2021/0221369 | A1* | 7/2021 | Kashefy | B60Q 1/444 |
| 2021/0389769 | A1* | 12/2021 | Hari | G05B 13/027 |
| 2022/0187449 | A1* | 6/2022 | Laoufi | G01S 13/52 |

OTHER PUBLICATIONS

Jongwoon Woo et al, "Study on the Test Method of AEB and FCW System," Main Research Institute: Daegu-Gyeongbuk Automotive Parts Foundation/Keimyung University, Publisher: The Korean Society Automotive Engineers 2013 Spring Conference (Published May 31, 2013).

Jonghyuk Kim et al, "Establishment of an Autonomous Emergency Braking System's Simulation Environment Based on Driving Simulator," Main Research Institute: National Forensic Service, Publisher: The Korean Society Automotive Engineers 2021 Fall Conference (Published Nov. 17, 2021).

Jonghyuk Kim et al, "A Study on the AEB Operation Simulation Using Prescan Based on the Vehicle Test," Main Research Institute: National Forensic Service, Publisher: The Korean Society Automotive Engineers (Published Mar. 2022), vol. 30, No. 3, pp. 249-257.

* cited by examiner

SIMULATION SYSTEM FOR ACCIDENT ANALYSIS OF AUTONOMOUS EMERGENCY BRAKING DEVICE AND SIMULATION METHOD THEREOF

CROSS-REFERENCE TO RELATED APPLICATION

This application is based on and claims priority under 35 U.S.C. § 119 to Korean Patent Application No. 10-2022-0052874, filed on Apr. 28, 2022, in the Korean Intellectual Property Office, the disclosure of which is incorporated by reference herein in its entirety.

BACKGROUND

1. Field

The disclosure relates to simulation systems and simulation methods for accident analysis of an autonomous emergency braking device, and more particularly, to simulation systems and simulation methods for accident analysis of an autonomous emergency braking device to which actual test data and radar characteristics of the autonomous emergency braking device are applied.

2. Description of the Related Art

In general, an advanced driver assistance system (ADAS) includes an autonomous emergency braking (AEB) device that recognizes an emergency situation and then generates a braking force by controlling a braking system.

When the ADAS recognizes an object in front of the vehicle, the ADAS determines whether the AEB device operates or not by measuring a relative distance, a relative speed, and an azimuth with respect to the object. The AEB device generates a braking pressure by transmitting a hydraulic pressure to a brake caliper in an emergency braking situation.

When the AEB device operates, a collision warning signal is output, and thereafter, a partial braking operation in which a deceleration of about 0.2 G occurs and a full braking operation in which a deceleration of about 1.0 G occurs are sequentially performed. The partial braking operation may be omitted. An entry time point of each operation is determined based on a relative speed and a time to collision.

SUMMARY

When a problem occurs in a vehicle equipped with an advanced driver assistance system including such an emergency braking device, it is necessary to determine the limitations of a function or performance of the advanced driver assistance system, driver's negligence, and the operation of an autonomous emergency braking device. Therefore, in order to analyze and reproduce an accident of a vehicle equipped with an advanced driver assistance system including an autonomous emergency braking device, a simulation system and method for simulating the operation of the autonomous emergency braking device are needed.

Provided is a simulation system and a simulation method for accident analysis of an autonomous emergency braking device. However, these problems are examples, and the scope of the disclosure is not limited thereto.

Additional aspects will be set forth in part in the description which follows and, in part, will be apparent from the description, or may be learned by practice of the presented embodiments of the disclosure.

According to an aspect of the disclosure, a simulation system for accident analysis of an autonomous emergency braking device, the simulation system includes a data input unit configured to receive virtual driving data including state data about a virtual driving vehicle, a target, and a driving environment, a radar driving logic unit configured to calculate a relative speed, a relative distance, and an azimuth between the virtual driving vehicle and the target based on the virtual driving data, and an autonomous emergency braking driving logic unit configured to output a warning signal or apply a braking pressure to the virtual driving vehicle according to a sequence of the autonomous emergency braking device, and to calculate collision data including a final stopping distance and a collision speed.

In an embodiment, the radar driving logic unit may further be configured to acquire a first radar sensor signal, a second radar sensor signal, and a camera sensor signal from the virtual driving data, obtain first fusion data by combining the first radar sensor signal and the camera sensor signal, obtain second fusion data by combining the second radar sensor signal and the camera sensor signal, and calculate a relative speed, a relative distance, and an azimuth between the virtual driving vehicle and the target based on the first fusion data and the second fusion data.

In an embodiment, the radar driving logic unit may be configured to store radar sensor characteristic data according to a vehicle model of the virtual driving vehicle.

In an embodiment, the autonomous emergency braking driving logic unit may further be configured to calculate a time to collision based on the relative speed and the relative distance, compare the relative speed and the time to collision with the actual test data about the autonomous emergency braking device, and output a warning signal or apply a braking pressure to the virtual driving vehicle.

In an embodiment, the autonomous emergency braking driving logic unit may further be configured to store actual test data about the autonomous emergency braking device for a plurality of vehicle models, and select actual test data about the autonomous emergency braking device corresponding to the vehicle model of the virtual driving vehicle, wherein the actual test data about the autonomous emergency braking device may include a value of time to collision according to a relative speed at which a warning operation, a partial braking operation, and a full braking operation start, the value of time being obtained through an actual test.

In an embodiment, the actual test data about the autonomous emergency braking device may include performance requirements for a warning operation, a partial braking operation, and a full braking operation according to a relative speed obtained in an experimental operation of a stop target autonomous emergency braking device of a test vehicle equipped with a differential global positioning system (DGPS) and an inertial measurement unit (IMU).

In an embodiment, the autonomous emergency braking driving logic unit may be configured to output a warning signal when the virtual driving vehicle satisfies the performance requirement for the warning operation, apply a partial braking pressure to the virtual driving vehicle when the performance requirement for the partial braking operation is satisfied, and apply a full braking pressure to the virtual driving vehicle when the performance requirement for the full braking operation is satisfied.

According to another aspect of the disclosure, a simulation method for accident analysis of an autonomous emergency braking device, the simulation method includes inputting virtual driving data including state data about a virtual driving vehicle, a target, and a driving environment to a computing device, calculating a relative speed, a relative distance, and an azimuth between the virtual driving vehicle and the target based on the virtual driving data, outputting a warning signal or applying a braking pressure to the virtual driving vehicle according to a sequence of the autonomous emergency braking device, and calculating collision data including a final stopping distance and a collision speed of the virtual driving vehicle.

In an embodiment, the calculating of the relative speed, the relative distance, and, the azimuth may include obtaining a first radar sensor signal, a second radar sensor signal, and a camera sensor signal from the virtual driving data, obtaining first fusion data by combining the first radar sensor signal and the camera sensor signal, obtaining second fusion data by combining the second radar sensor signal and the camera sensor signal, and calculating a relative speed, a relative distance, and an azimuth between the virtual driving vehicle and the target based on the first fusion data and the second fusion data.

In an embodiment, the first radar sensor signal and the second radar sensor signal each may be obtained according to a characteristic logic of a radar sensor according to a vehicle model of the virtual driving vehicle.

In an embodiment, the applying of the braking pressure may include calculating a time to collision from the relative speed, the relative distance, and the azimuth, and outputting a warning signal or applying a braking pressure to the virtual driving vehicle by comparing the relative speed and the time to collision with the performance requirements for the warning operation, the partial braking operation, and the full braking operation included in the actual test data about the autonomous emergency braking.

In an embodiment, in determining of the warning signal and the braking pressure, the computing device may be configured to output a warning signal when the virtual driving vehicle satisfies the performance requirement for the warning operation, apply a partial braking pressure to the virtual driving vehicle when the performance requirement for the partial braking operation is satisfied, and apply a full braking pressure to the virtual driving vehicle when the performance requirement for the full braking operation is satisfied.

In an embodiment, the applying of the braking pressure may further include selecting actual test data about the autonomous emergency braking device according to a vehicle model of the virtual driving vehicle from among actual test data about the autonomous emergency braking device for a plurality of vehicle models.

In an embodiment, the actual test data about the emergency braking device may include performance requirements for warning operation, partial braking operation, and full braking operation according to a relative speed obtained in an experimental operation of the emergency braking device of a test vehicle equipped with the DGPS and the IMU.

Other aspects, features, and advantages other than those described above will become apparent from the following drawings, claims, and detailed description of the disclosure.

These general and specific aspects may be implemented using systems, methods, computer programs, or any combination of systems, methods, and computer programs.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
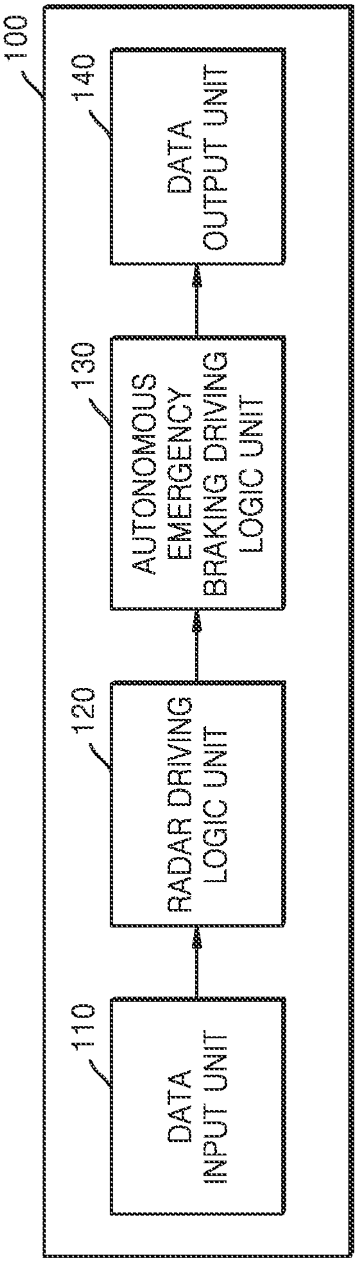
FIG. 1 is a schematic block diagram illustrating a simulation system for accident analysis of an autonomous emergency braking device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The disclosure may be modified into various forms and may have various embodiments. In this regards, the disclosure will now be made in detail to embodiments, examples of which are illustrated in the accompanying drawings. The advantages, features, and methods of achieving the advantages may be clear when referring to the embodiments described below together with the drawings. However, the disclosure may have different forms and should not be construed as being limited to the descriptions set forth herein.

Hereafter, the disclosure will be described more fully with reference to the accompanying drawings, in which embodiments of the disclosure are shown. In describing the disclosure with reference to the drawings, like reference numerals are used for elements that are substantially identical or correspond to each other, and the descriptions thereof will not be repeated.

It will be understood that, although the terms "first", "second", "third", etc., may be used herein to describe various elements, these elements should not be limited by these terms.

In the specification, As used herein, the singular forms are intended to include the plural forms as well, unless the context clearly indicates otherwise The terms "comprises" and/or "comprising," when used in this specification, specify the presence of stated features or constituent elements but do not preclude the presence or addition of one or more other features or constituent elements.

In the specification, "A and/or B" refers to A, B, or A and B. And, "at least one of A and B" represents a case of A, B, or A and B.

In the specification, when an element is referred to as being "connected" to another element, it may include not only a case of "directly connected" but also a case of "indirectly connected" with another element interposed therebetween. It should be understood that, when an element "comprises" or "includes" another element, unless otherwise defined, it is not excluding other elements but may further include other elements.

When a certain embodiment may be implemented differently, a specific process order may be performed differently from the described order. For example, two consecutively described processes may be performed substantially at the same time or performed in an order opposite to the described order.

In the specification, some embodiments may be represented by functional block configurations and various processing operations. Some or all of the functional blocks may be implemented in various numbers of hardware and/or software configurations that perform particular functions. For example, the functional blocks of the disclosure may be implemented by one or more microprocessors or by circuit configurations for a given function.

The functional blocks of the disclosure may be implemented in various programming or scripting languages. The functional blocks of the specification may be implemented in algorithms running on one or more processors. A function performed by a functional block in the specification may be performed by a plurality of functional blocks, or functions performed by a plurality of functional blocks in the specification may be performed by one functional block. In addition, the specification may employ techniques of the related art for setting an electronic environment, signal processing, and/or data processing, and the like.

FIG. 1 is a schematic block diagram illustrating a simulation system 100 for accident analysis of an autonomous emergency braking device according to an embodiment.

Referring to FIG. 1, the simulation system 100 for analyzing an accident of an autonomous emergency braking device according to an embodiment may include a data input unit 110, a radar driving logic unit 120, and an autonomous emergency braking driving logic unit 130 and a data output unit 140.

The simulation system 100 for accident analysis of the autonomous emergency braking device may be at least one processor or a computing device including at least one processor. For example, the simulation system 100 for accident analysis of the autonomous emergency braking device may be driven in a form included in other hardware devices, such as a microprocessor or a general-purpose computer system.

Specifically, the simulation system 100 for the accident analysis of the autonomous emergency braking device may be a typical computing device including a processor, a memory, a storage, and the like. In addition, the simulation system 100 for accident analysis of the autonomous emergency braking device may achieve desired system performance by using a combination of a network device, such as a router and a switch, an input device, and/or an output device.

The simulation system 100 for accident analysis of the autonomous emergency braking device may set a dynamics model, a simulation program, etc. through the data input unit 110 having an input device, and may receive virtual driving data including a virtual driving scenario. The virtual driving data may include state data about a driving environment, such as the vehicle model of the virtual driving vehicle (Ego Vehicle), driving speed, target location, target speed, and curvature and slope of the road.

In some embodiments, the input device may be a device for downloading a dynamics model, a simulation program, and/or virtual driving data from an external server through wireless communication, wired communication, or external storage. In some embodiments, the dynamics model, the simulation program, etc. may be stored in a memory of the simulation system 100 for accident analysis of the autonomous emergency braking device at a time of output of the simulation system 100 for analyzing the accident of the autonomous emergency braking device.

In an embodiment, a virtual driving scenario may include a scenario according to the autonomous emergency braking test protocol. For example, the virtual driving scenario may be a European New Car Assessment Program Autonomous Emergency Braking (Euro NCAP AEB) test protocol scenario. The state data about a target included in the virtual driving data may simulate a Global Vehicle Target (GVT) specified by Euro NCAP, and the state data about the driving environment may be a simulation of a Car-to-Car Rear Stationary (CCRs) 100% test environment, but, the disclosure is not limited thereto, and various changes may be applied to the virtual driving scenario and virtual driving data as needed.

The radar driving logic unit 120 may calculate a relative speed, a relative distance, and an azimuth between a virtual driving vehicle and a target based on the virtual driving data. For example, the radar driving logic unit 120 may generate a virtual radar sensor signal based on the virtual driving data, and may calculate a relative speed, a relative distance, and an azimuth between the virtual driving vehicle and the target by fusion of the virtual radar sensor signal with the camera sensor signal. In an embodiment, the radar driving logic unit 120 may include radar sensor characteristic data according to a vehicle model obtained through an actual experiment, and may generate a virtual radar sensor signal by reflecting the radar sensor characteristic data.

The autonomous emergency braking driving logic unit 130 may select a sequence of an autonomous emergency braking device applied to a virtual driving vehicle, may output a warning signal to the virtual driving vehicle according to a sequence of the selected autonomous emergency braking, may apply a virtual braking pressure, and may calculate collision data including a final stopping distance and a collision speed by using a vehicle dynamics model.

In one embodiment, the autonomous emergency braking driving logic unit 130 may calculate a time to collision between a virtual driving vehicle and a main target expected to collide based on a relative speed, a relative distance, and an azimuth calculated by the radar driving logic unit 120, and may determine a braking pressure applied to the virtual driving vehicle by comparing the relative speed and the time to collision with execution requirements for the sequence of the autonomous emergency braking.

Here, the sequence of the autonomous emergency braking device may include a warning operation, a partial braking operation, and a full braking operation. In some embodiments, the partial braking operation may be omitted. The autonomous emergency braking driving logic unit 130 may include autonomous emergency braking actual test data including performance requirement data about a warning operation, a partial braking operation, and a full braking operation according to a relative speed obtained in an actual test of the autonomous emergency braking device of each test vehicle model.

The data output unit 140 may output simulation values including collision data to a user. In an embodiment, the data output unit 140 may transmit the simulation values including collision data to a display device or a printing device. In another embodiment, the data output unit 140 may transmit the simulation values to other computing devices through wired/wireless network equipment, such as Ethernet, Wi-Fi chip, Bluetooth chip, wireless communication chip, Near-Field Communication (NFC) chip, and the like.

Figure 2:
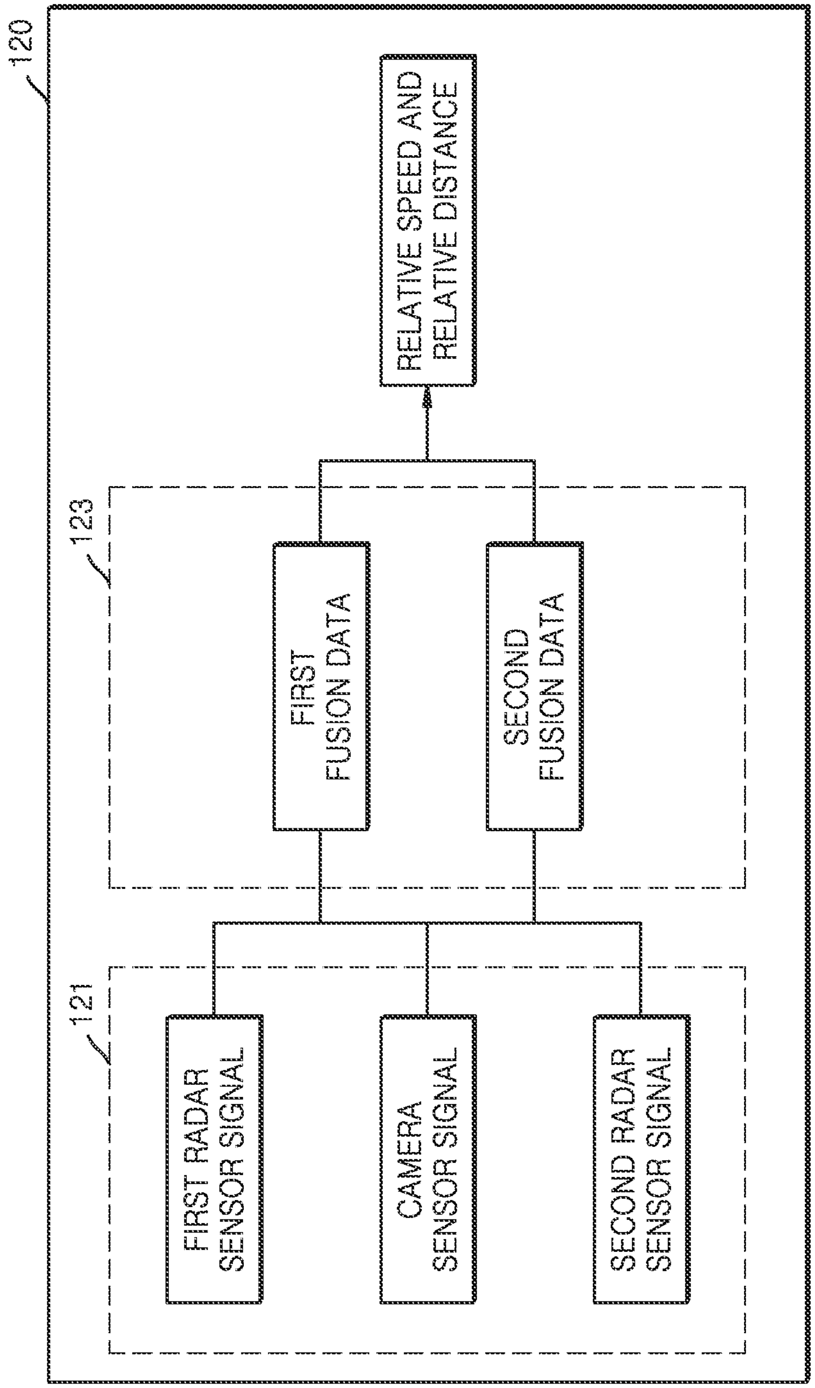
FIG. 2 is a schematic block diagram illustrating a radar driving logic unit illustrated in FIG. 1.

FIG. 2 is a schematic block diagram illustrating a radar driving logic unit illustrated in FIG. 1.

Referring to FIG. 2, the radar driving logic unit 120 may include a signal acquisition unit 121 and a sensor fusion unit 123.

The signal acquisition unit 121 acquires a virtual radar sensor signal and a camera sensor signal from virtual driving data input to the data input unit 110. Here, the radar sensor signal may be calculated from the virtual driving data based on the characteristic data about the radar sensor according to the vehicle model of the virtual driving vehicle.

In one embodiment, the radar sensor signal simulated by the radar driving logic unit 120 may be simulated data obtained from data acquired by emitting an electromagnetic wave in a preset direction from a radar sensor attached to the vehicle and receiving an echo signal reflected by the emitted electromagnetic wave from an object.

In relation to the above, in FIG. 2, a situation in which the signal acquisition unit 121 acquires a first radar sensor signal and a second radar sensor signal from the first and second radar sensors located in front of the virtual driving vehicle, respectively, is simulated, but is not limited thereto. Here, the first radar sensor may be a long-range radar sensor, and the second radar sensor may be a mid-range radar sensor.

The type, attachment location, number, and performance of the radar sensor may be different depending on a vehicle model, and in order to reflect these differences, characteristic data about the radar sensor may be obtained through an actual test for each vehicle model, and the characteristic data may be stored in the radar driving logic unit 120. The signal acquisition unit 121 may acquire a virtual radar sensor signal from virtual driving data by reflecting characteristic data about the radar sensor according to the vehicle model of the virtual driving vehicle selected by the user.

In an embodiment, the signal acquisition unit 121 may acquire virtual signals of other sensors, such as a Light Detection and Ranging (LiDAR) sensor or an ultrasonic sensor.

The sensor fusion unit 123 may acquire fusion data by sensor fusion of a camera sensor signal and a radar sensor signal. In an embodiment, the sensor fusion unit 123 may include a sensor fusion algorithm that uses a Kalman filter.

The sensor fusion unit 123 may acquire first fusion data for targets located in a long-range by fusing a first radar sensor signal and a camera sensor signal, and acquire second fusion data for targets located in a mid-range by fusing the second radar sensor signal and the camera sensor signal. The sensor fusion unit 123 may acquire a relative speed, a relative distance and an azimuth of the targets within a field of view from the first fusion data and the second fusion data.

Figure 3:
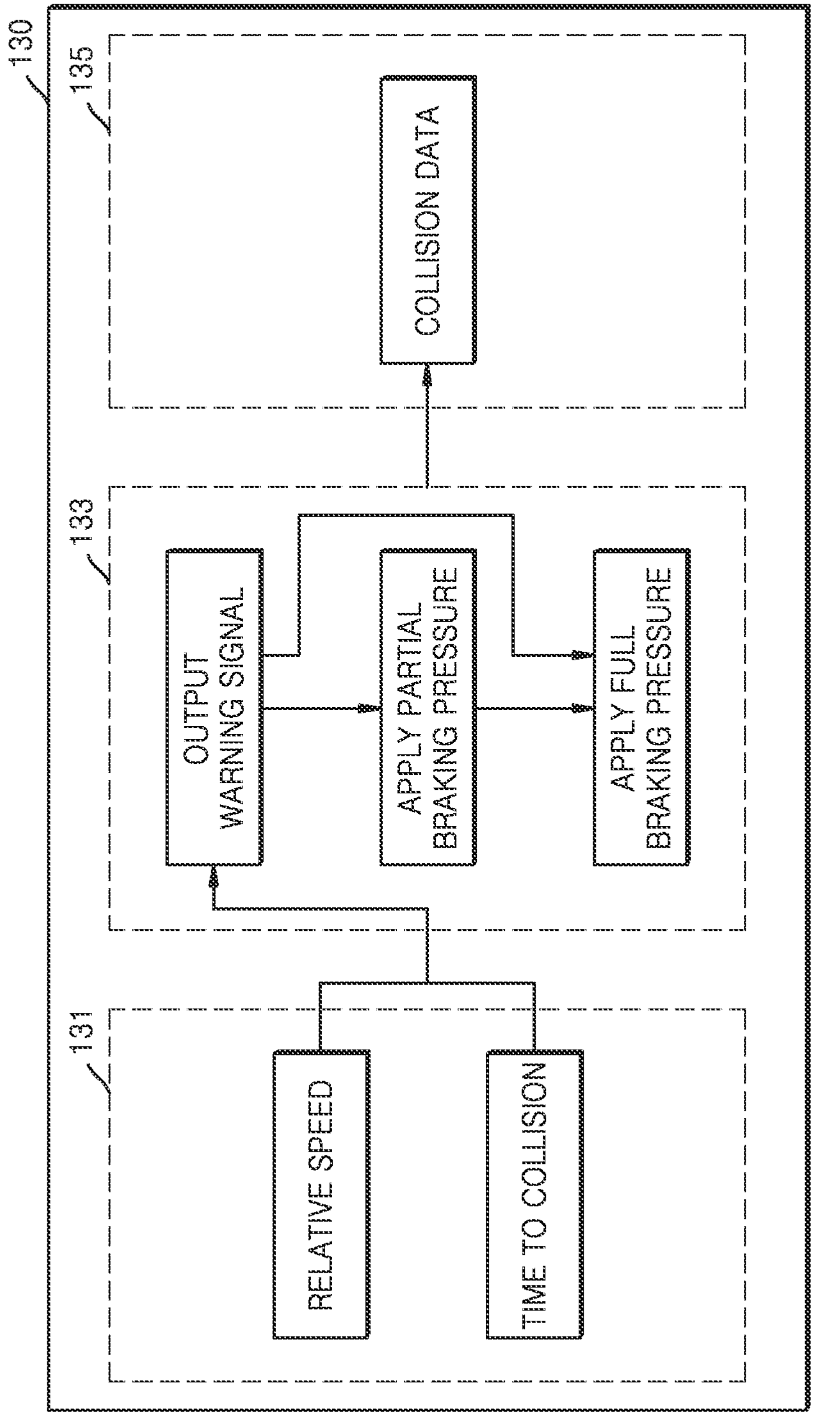
FIG. 3 is a schematic block diagram illustrating a driving logic unit of the autonomous emergency braking device illustrated in FIG. 1.

FIG. 3 is a schematic block diagram illustrating an autonomous emergency braking driving logic unit 130 shown in FIG. 1.

Referring to FIG. 3, the autonomous emergency braking driving logic unit 130 may include a calculation unit 131, a braking operation unit 133, and a collision data calculation unit 135.

First, the autonomous emergency braking driving logic unit 130 may select from data a main target (the most important object) with a potential for collision, such as a relative speed, a relative distance, and an azimuth of targets output by the radar driving logic unit 120, and may calculate a time to collision of the main target with the virtual driving vehicle.

A formula for calculating a time to collision is as Equation 1 below.

$$TTC\ (\text{sec}) = \frac{\text{relative distance (m)}}{\text{relative speed (m/sec)}} \qquad \text{[Equation 1]}$$

The performance requirements for each sequence of an autonomous emergency braking device are based on a time to collision rather than a simple operation time, and the braking operation unit 133 may select a sequence of the autonomous emergency braking device to be applied to the virtual driving vehicle by using input variables, such as a time to collision and a relative speed calculated by the calculation unit 131.

In an embodiment, the braking operation unit 133 may include autonomous emergency braking actual test data for a plurality of vehicle models. The autonomous emergency braking actual test data for a plurality of vehicle models may be obtained through a collision test using a test vehicle. The autonomous emergency braking actual test data may include performance requirements for each autonomous emergency braking sequence with respect to a time to collision and a relative speed.

The braking operation unit 133 may compare actual autonomous emergency braking test data for each vehicle model obtained through the actual test with a time to collision and a relative speed obtained by the operation unit 131 to output a warning signal to the virtual driving vehicle or apply braking pressure.

For example, the braking operation unit 133 may load autonomous emergency braking test data for the same vehicle model as that of the virtual driving vehicle selected by the data input unit 110, and compare the relative speed and the time to collision of the main target obtained by the operation unit 131 with the autonomous emergency braking actual test data to determine a sequence of the autonomous emergency braking device applied to a virtual driving vehicle.

An operation sequence of the autonomous emergency braking device may include a forward collision warning, a partial braking operation, and a full braking operation, and performance requirements for the operation sequence may be different depending on the vehicle model. Each operation may be performed sequentially, but some operations may be omitted. For example, the braking operation unit 133 may compare a relative speed and a time to collision between a virtual driving vehicle and a main target with the autonomous emergency braking actual test data so that a warning operation, a partial braking operation, and a full braking operation are sequentially carried out according to a certain sequence. In this case, a warning signal may be output to the virtual driving vehicle when a performance requirement of the warning operation is satisfied, a partial braking pressure may be applied to the virtual driving vehicle when a performance requirement of the partial braking operation is satisfied, and a maximum braking pressure may be applied to the virtual driving vehicle when a performance requirement of the full braking operation is satisfied. In the case of a vehicle model in which the partial braking operation is omitted, a maximum braking pressure may be applied immediately after the output of a warning signal. In addition, if a time to collision between a virtual driving vehicle and a main target is the same as or less than the time to collision that satisfies a full braking operation performance requirement in autonomous emergency braking real test data, the braking operation unit 133 may omit a partial braking operation and apply a maximum braking pressure to the virtual driving vehicle.

The collision data calculation unit 135 may calculate collision data based on a braking pressure applied to the virtual driving vehicle, a relative distance, a relative speed, an azimuth, and state data about a driving environment according to a dynamics model or the like. The collision data may include values of a final stopping distance of the virtual driving vehicle, whether the vehicle collides with a target, and a collision speed.

Figure 4:
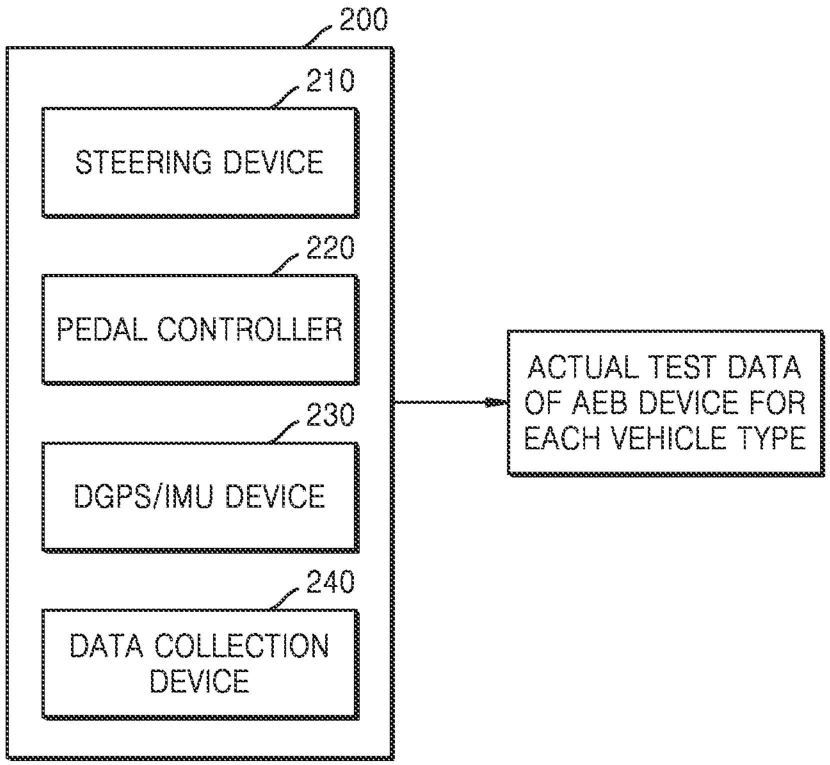
FIG. 4 is a schematic block diagram illustrating a test vehicle for acquiring actual test data about an autonomous emergency braking device according to an embodiment.
Figure 5:
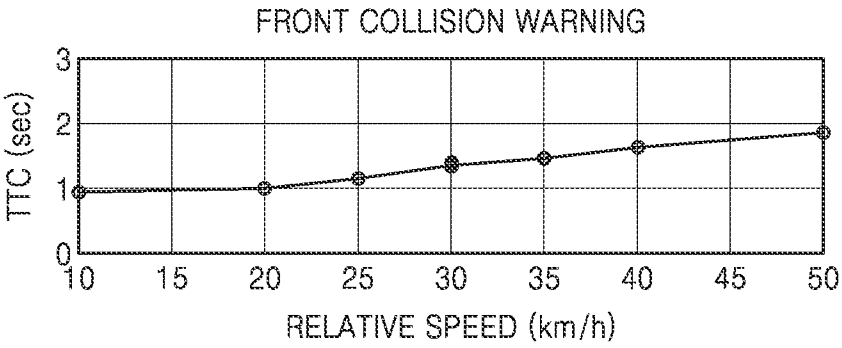
FIG. 5 is a graph showing a warning timing according to a relative speed.
Figure 6:
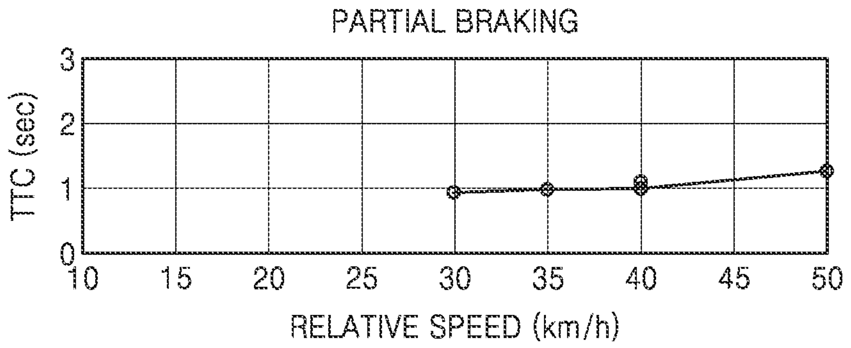
FIG. 6 is a graph showing a partial braking timing according to a relative speed.
Figure 7:
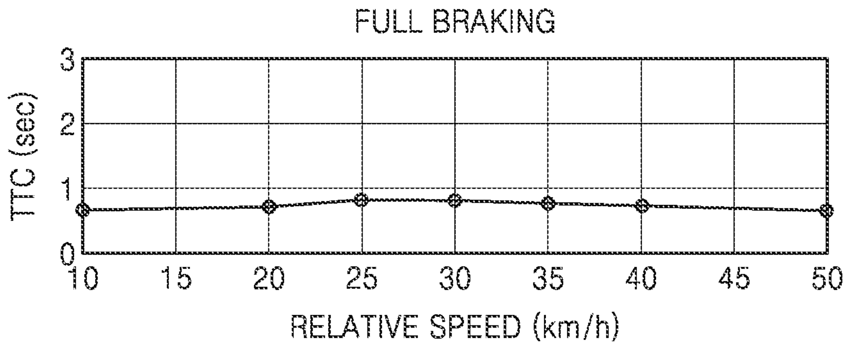
FIG. 7 is a graph showing a full braking timing according to a relative speed.

FIG. 4 is a schematic diagram illustrating a test vehicle 200 for acquiring autonomous emergency braking actual test data according to an embodiment. FIG. 5 is a graph showing a warning timing according to a relative speed in autonomous emergency braking actual test data, FIG. 6 is a graph showing a partial braking timing according to the relative speed, and FIG. 7 is a graph showing a full braking timing according to the relative speed. FIGS. 5 to 7 are a part of autonomous emergency braking actual test data obtained by using 2019 Grandeur as an experimental vehicle 200.

In order to obtain autonomous emergency braking actual test data, an experiment may be performed to satisfy the criteria of an AEB C2C Test protocol of Euro NCAP, and the test vehicle 200 may be selected from a vehicle model that is actually sold. The experimental vehicle 200 may include a steering device 210, a pedal controller 220, a Differential Global Positioning System/Inertial Measurement Unit (DGPS/IMU) device 230, and a data collection device 240.

In order to satisfy a Euro NCAP AEB test standard, the test vehicle 200 may control a GPS-based speed and an overlap with a target by using the experimental steering device 210 and the pedal controller 220. In some embodiments, in order to obtain more precise GPS data, the test vehicle 200 may include the DGPS/IMU device 230. Experimental data acquired by the experimental vehicle 200 and the target may be acquired by using the data collection device 240 mounted inside the experimental vehicle 200.

The autonomous emergency braking actual test data for each vehicle model may include performance requirements for each operation according to a sequence of an autonomous emergency braking device measured by increasing a speed by 5 km/h increments from 10 km/h to 70 km/h for each vehicle model. As described above, the performance requirement may be based on the time to collision. A sequence of an autonomous emergency braking device may include operations of a warning, a partial braking, and a full braking, and performance requirements for each operation may be different depending on the vehicle model. In some car models, the partial braking operation may be omitted. Also, the partial braking operation may be omitted during a low-speed driving. For example, it was confirmed through an experiment that the partial braking operation operates when a relative speed between the target and the test vehicle 200 is 30 km/h or more.

In this regard, FIG. 5 shows that a time to collision value of the warning operation performance requirement increases as the relative speed of the test vehicle 200 increases. For example, when the relative speed between the test vehicle 200 and the target is 20 km/h, a warning signal of the test vehicle 200 is output when the time to collision value is 1 sec. On the other hand, when a relative speed between the test vehicle 200 and the target is 50 km/h, a warning signal of the test vehicle 200 is output when the time to collision value is about 1.9 sec.

Referring to FIG. 6, it may be seen that the partial braking operation is operated when a relative speed between the test vehicle 200 and the target is 30 km/h or more. In addition, when the relative speed is 30 km/h or more, a time to collision required for the partial braking operation to operate also increased as the relative speed of the test vehicle 200 increased.

Referring to FIG. 7, it is confirmed that the performance requirement for the full braking operation is application of a maximum braking pressure to the test vehicle 200 in a range of time to collision of about 0.7 seconds to about 0.9 seconds regardless of the relative speed between the test vehicle 200 and the target. Thus, an actual performance requirement of the autonomous emergency braking sequence may be different from a manual provided by the vehicle manufacturer, so it is difficult to apply the actual performance requirement as it is when analyzing and simulating a traffic accident of a vehicle equipped with an autonomous emergency braking device. Accordingly, embodiments of the disclosure calculate collision data by using autonomous emergency braking actual test data acquired through an actual test using the experimental vehicle 200, and thus, may implement a simulation system for accident analysis of an autonomous emergency braking device more similar to a real vehicle.

Figure 8:
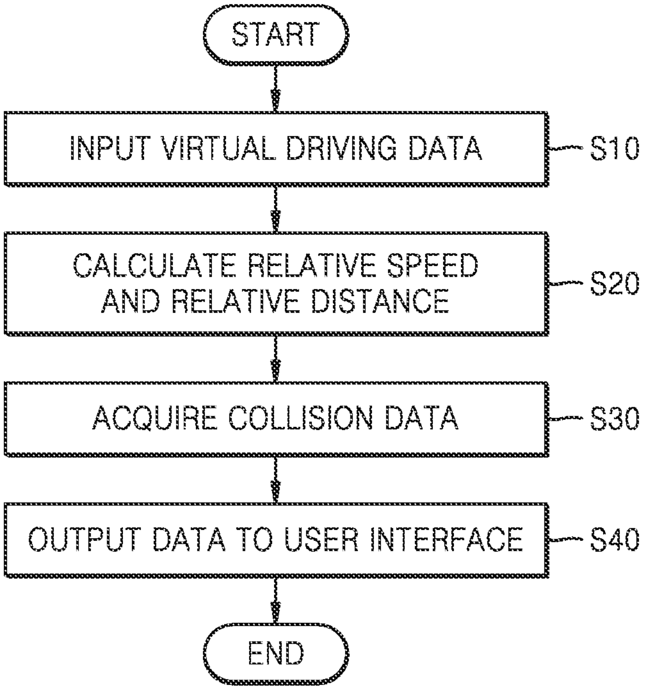
FIG. 8 is a flowchart illustrating a simulation method for accident analysis of an autonomous emergency braking device according to an embodiment.

FIG. 8 is a flowchart illustrating a simulation method for accident analysis of an autonomous emergency braking device according to an embodiment.

Referring to FIG. 8, the simulation method for accident analysis of an autonomous emergency braking device according to an embodiment includes inputting a virtual driving data (S10), calculating a relative speed, a relative distance, and an azimuth (S20), acquiring collision data (S30), and outputting data (S40).

In operation of inputting of the virtual driving data (S10), the simulation system for accident analysis of the autonomous emergency braking device may receive the virtual driving data. The virtual driving data may include state data about a driving environment, such as a vehicle model of the virtual driving vehicle, a driving speed, a target position, a target speed, a curvature and inclination of the road, etc.

In operation of calculating a relative speed, a relative distance, and an azimuth (S20), the simulation system for accident analysis of the autonomous emergency braking device calculates a relative speed, a relative distance, and an azimuth between the virtual driving vehicle and the target based on a received virtual driving data. In some embodiments, the autonomous emergency braking device may obtain a radar sensor signal from the virtual driving data based on a radar sensor characteristic data according to the vehicle model of the virtual driving vehicle, and may calculate a relative speed, a relative distance, and an azimuth of the virtual driving vehicle and the target by combining the radar sensor signal with the camera sensor signal.

In the operation of acquiring collision data (S30), the simulation system for accident analysis of the autonomous emergency braking device sets a main target based on a driving direction of the virtual driving vehicle, calculates a time to collision between the main target and the virtual driving vehicle, compares a relative speed and a time to collision of the virtual driving vehicle with actual test data about the autonomous emergency braking device, and outputs a warning or applies a braking pressure to the virtual driving vehicle according to the emergency braking sequence.

For example, the simulation system for accident analysis of the autonomous emergency braking device selects and loads actual test data about the autonomous emergency braking device of a vehicle model corresponding to the vehicle model of the virtual driving vehicle selected by the user, and compares a relative speed of the main target and the virtual driving vehicle with the actual test data about the selected autonomous emergency braking. When the relative speed and the time to collision satisfy the performance requirements for a warning operation, a warning signal may be output to the virtual driving vehicle, when the relative speed and time to collision satisfy the performance requirements for partial braking, a partial braking pressure may be applied to the virtual driving vehicle, and when the relative speed and the time to collision satisfy the performance requirements for the full braking operation, a maximum braking pressure may be applied to the virtual driving vehicle. Each operation is sequentially operated according to a sequence, but some operations may be omitted depending on the speed or model of vehicle. For example, when the relative speed between the virtual driving vehicle and the target is 30 km/h or less, the partial braking operation may be omitted.

The simulation system for the accident analysis of the autonomous emergency braking device may calculate collision data including a final stopping distance and a collision speed based on virtual driving data and a dynamics model.

In the operation of outputting data to a user interface (S40), the simulation system for accident analysis of the autonomous emergency braking device may output calculated collision data to the user interface. In some embodiments, the user interface may include an output device, such as a display, a printing device, or a portable memory device, etc. In some other embodiments, the user interface may include a separate computing device connected to a simulation system for accident analysis of the autonomous emergency braking device through a network device, such as Ethernet. The simulation system for the accident analysis of the autonomous emergency braking device may process the calculated collision data through additional calculations according to the user's needs, or may output the calculated collision data in a table, graph, etc. on the user interface.

Figure 9:
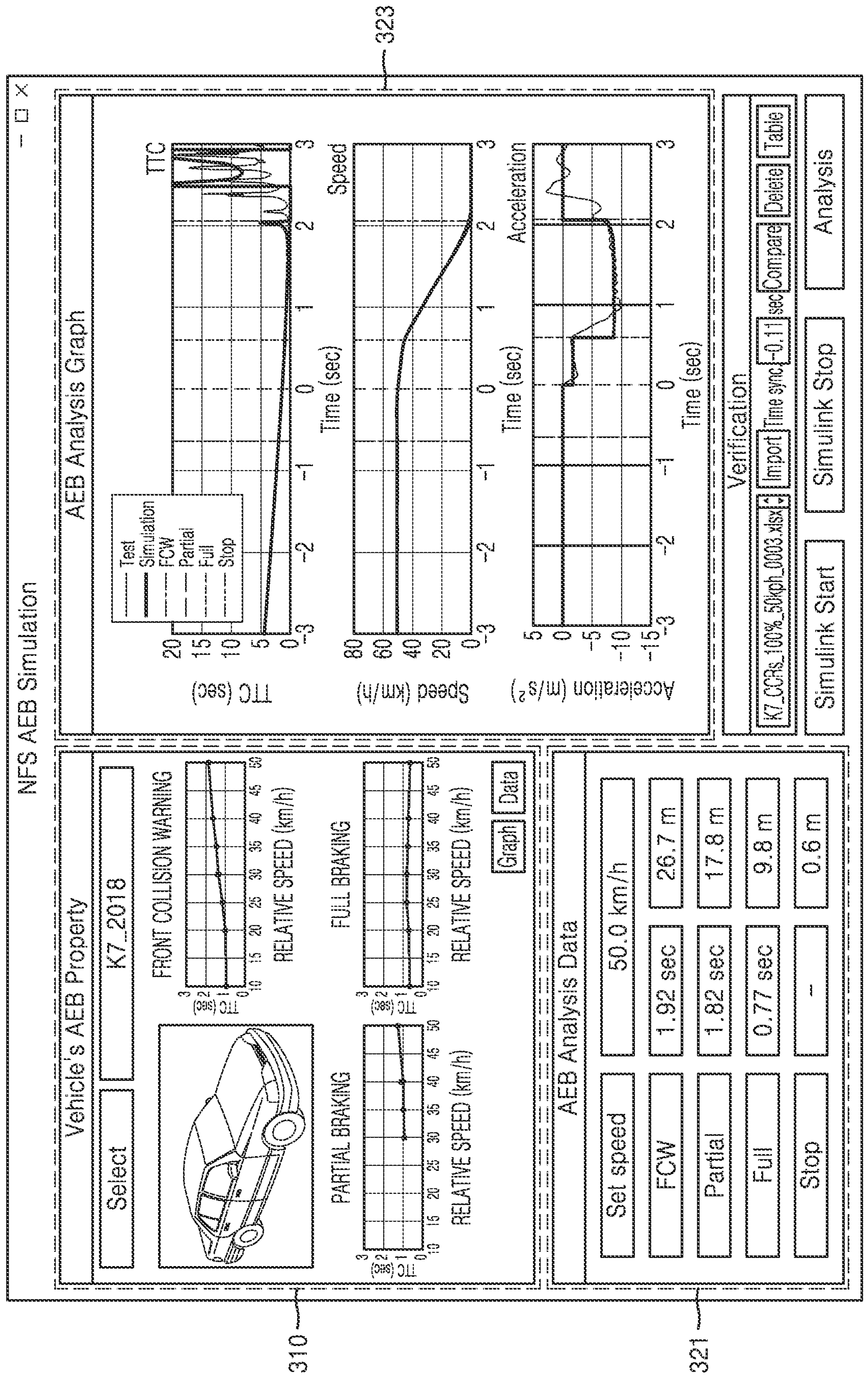
FIG. 9 is a diagram illustrating a user interface of a simulation system for analyzing an accident, of an autonomous emergency braking device according to an embodiment.

FIG. 9 is a user interface screen of a simulation system for analyzing an accident of an autonomous emergency braking device according to an embodiment.

Referring to FIG. 9, the user interface screen of the simulation system for the accident analysis of the autonomous emergency braking device includes an input unit 310 for a user to select a vehicle model of a virtual driving vehicle, a performance requirement output unit 321 for each operation, and a graph output unit 323. In some embodiments, the user interface screen may be displayed on an output device included in the simulation system. In some other embodiments, the user interface screen may be displayed on a separate computing device or an output device connected to the simulation system.

In the input unit 310, the user may select a vehicle model of the virtual driving vehicle and check the autonomous emergency braking actual test data about the selected vehicle. An autonomous emergency braking actual test data may be provided as graphs or numerical values.

The performance requirement output unit 321 may display for each operation a distance to a target at the time of satisfying the performance requirements for each operation and the operation time of collision data calculated by the simulation system for accident analysis of the autonomous emergency braking device. In relation to this, FIG. 9 shows displaying of a distance to a target and a final stopping distance at the time of satisfying the performance requirements for each of the warning operation, the partial braking operation, and the full braking operation and at the time of operation according to a set speed.

Simulation graphs required by the user may be output from the graph output unit 323 based on the virtual driving data and the collision data. In relation to this, FIG. 9 shows a graph of a change in time to collision according to an operation time change, a graph of a speed change of a virtual driving vehicle according to time, and a graph of a change in acceleration of the virtual driving vehicle according to time. The simulation graph output by the graph output unit 323 may be changed according to a user's selection.

The user interface screen is not limited to that shown in FIG. 9, and various changes are possible as needed.

While the disclosure has been described with reference to the embodiments shown in the drawings, it will be understood by those of ordinary skill in the art that various changes in form and details may be made therein without departing from the spirit and scope of the disclosure. Therefore, the true technical scope of the disclosure should be determined by the technical spirit of the appended claims.

According to an embodiment of the disclosure described above, a simulation system and a simulation method for analyzing an accident of an autonomous emergency braking device that simulates the operation of the autonomous emergency braking device may be implemented. Of course, the scope of the disclosure is not limited by these effects. It should be understood that embodiments described herein should be considered in a descriptive sense only and not for purposes of limitation.

What is claimed is:

1. A simulation system for accident analysis of an autonomous emergency braking device, the simulation system comprising:

a data input unit configured to receive virtual driving data including state data about a virtual driving vehicle, a target, and a driving environment;

a radar driving logic unit configured to calculate a relative speed, a relative distance, and an azimuth between the virtual driving vehicle and the target based on the virtual driving data; and an autonomous emergency braking driving logic unit configured to output a warning signal or apply a braking pressure to the virtual driving vehicle according to a sequence of the autonomous emergency braking device, and to calculate collision data including a final stopping distance and a collision speed, wherein the autonomous emergency braking driving logic unit is further configured to calculate a time to collision based on the relative speed, the relative distance, and the azimuth, and compare the relative speed and the time to collision with actual test data about the autonomous emergency braking device.

2. The simulation system of claim 1, wherein the radar driving logic unit is further configured to acquire a first radar sensor signal, a second radar sensor signal, and a camera sensor signal from the virtual driving data, obtain first fusion data by combining the first radar sensor signal and the camera sensor signal, obtain second fusion data by combining the second radar sensor signal and the camera sensor signal, and calculate a relative speed, a relative distance, and an azimuth between the virtual driving vehicle and the target based on the first fusion data and the second fusion data.

3. The simulation system of claim 2, wherein the radar driving logic unit is configured to store radar sensor characteristic data according to a vehicle model of the virtual driving vehicle.

4. The simulation system of claim 1, wherein the autonomous emergency braking driving logic unit is further configured to store actual test data about the autonomous emergency braking device for a plurality of vehicle models, and select actual test data about the autonomous emergency braking device corresponding to the vehicle model of the virtual driving vehicle, wherein the actual test data about the autonomous emergency braking device includes a value of time to collision according to a relative speed at which a warning operation, a partial braking operation, and a full braking operation start, the value of time being obtained through an actual test.

5. The simulation system of claim 1, wherein the actual test data about the autonomous emergency braking device includes performance requirements for a warning operation, a partial braking operation, and a full braking operation according to a relative speed obtained in an experimental operation of a stop target autonomous emergency braking device of a test vehicle equipped with a differential global positioning system (DGPS) and an inertial measurement unit (IMU).

6. The simulation system of claim 5, wherein the autonomous emergency braking driving logic unit is configured to output the warning signal when the virtual driving vehicle satisfies the performance requirement for the warning operation, apply a partial braking pressure to the virtual driving vehicle when the performance requirement for the partial braking operation is satisfied, and apply a full braking pressure to the virtual driving vehicle when the performance requirement for the full braking operation is satisfied.

7. A simulation method for accident analysis of an autonomous emergency braking device, the simulation method comprising:

inputting virtual driving data including state data about a virtual driving vehicle, a target, and a driving environment to a computing device;

calculating a relative speed, a relative distance, and an azimuth between the virtual driving vehicle and the target based on the virtual driving data;

outputting a warning signal or applying a braking pressure to the virtual driving vehicle according to a sequence of the autonomous emergency braking device; and calculating collision data including a final stopping distance and a collision speed of the virtual driving vehicle, wherein the calculating of the relative speed, the relative distance, and, the azimuth includes:

obtaining a first radar sensor signal, a second radar sensor signal, and a camera sensor signal from the virtual driving data;

obtaining first fusion data by combining the first radar sensor signal and the camera sensor signal;

obtaining second fusion data by combining the second radar sensor signal and the camera sensor signal; and calculating a relative speed, a relative distance, and an azimuth between the virtual driving vehicle and the target based on the first fusion data and the second fusion data.

8. The simulation method of claim 7, wherein the first radar sensor signal and the second radar sensor signal are each obtained according to a characteristic logic of a radar sensor according to a vehicle model of the virtual driving vehicle.

9. The simulation method of claim 7, wherein the applying of the braking pressure includes calculating a time to collision from the relative speed, the relative distance, and the azimuth, and wherein the step of outputting the warning signal or the applying the braking pressure to the virtual driving vehicle includes comparing the relative speed and the time to collision with performance requirements for a warning operation, a partial braking operation, and a full braking operation included in actual test data about the autonomous emergency braking device.

10. The simulation method of claim 9, wherein, in the outputting the warming signal or the applying the braking pressure, the computing device is configured to output the warning signal when the virtual driving vehicle satisfies the performance requirement for the warning operation, apply a partial braking pressure to the virtual driving vehicle when the performance requirement for the partial braking operation is satisfied, and apply a full braking pressure to the virtual driving vehicle when the performance requirement for the full braking operation is satisfied.

11. The simulation method of claim 7, wherein the applying of the braking pressure further includes selecting actual test data about the autonomous emergency braking device according to a vehicle model of the virtual driving vehicle from among actual test data about the autonomous emergency braking device for a plurality of vehicle models.

12. The simulation method of claim 11, wherein the actual test data about the autonomous emergency braking device includes performance requirements for a warning operation, a partial braking operation, and a full braking operation according to a relative speed obtained in an experimental operation of the autonomous emergency braking device of a test vehicle equipped with a differential global positioning system (DGPS) and an inertial measurement unit (IMU).

* * * * *